US011232395B1

(12) United States Patent
Crandall et al.

(10) Patent No.: US 11,232,395 B1
(45) Date of Patent: Jan. 25, 2022

(54) SIGNAL PROCESSING TECHNIQUES

(71) Applicant: Amazon Technologies, Inc., Seattle, WA (US)

(72) Inventors: Robert Crandall, Seattle, WA (US); Paul Eugene Munger, Seattle, WA (US); Nikhil Chacko, Seattle, WA (US); Liefeng Bo, Seattle, WA (US); Gerard Guy Medioni, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 115 days.

(21) Appl. No.: 15/199,030

(22) Filed: Jun. 30, 2016

(51) Int. Cl.
*G06Q 30/00* (2012.01)
*G06Q 10/08* (2012.01)
*G06F 7/02* (2006.01)

(52) U.S. Cl.
CPC ............ *G06Q 10/087* (2013.01); *G06F 7/02* (2013.01)

(58) Field of Classification Search
CPC ...... G06Q 30/00; G06Q 30/06; G06Q 10/087; G06K 7/00; G06F 7/02
USPC ........................................................ 705/28
See application file for complete search history.

(56) References Cited

U.S. PATENT DOCUMENTS

| | | | |
|---|---|---|---|
| 5,485,395 A * | 1/1996 | Smith | G01R 23/167 324/76.19 |
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 10,127,438 B1 | 11/2018 | Fisher et al. | |
| 10,133,933 B1 | 11/2018 | Fisher et al. | |
| 2013/0103537 A1 * | 4/2013 | Hewett | G06Q 30/0633 705/26.7 |
| 2013/0211976 A1 * | 8/2013 | Breed | G08B 25/08 705/28 |
| 2013/0284806 A1 * | 10/2013 | Margalit | G06Q 30/06 235/382 |
| 2017/0001656 A1 * | 1/2017 | Katayama | A61H 3/04 |
| 2018/0139069 A1 * | 5/2018 | Rawlins | G06F 3/04847 |

FOREIGN PATENT DOCUMENTS

WO WO-2013059716 A2 * 4/2013 ............. G06Q 30/06

* cited by examiner

*Primary Examiner* — Russell S Glass
(74) *Attorney, Agent, or Firm* — Lee & Hayes, P.C.

(57) ABSTRACT

This disclosure describes techniques for removing noise from a signal to generate a modified signal, with the modified signal preserving any transitions of interest (e.g., sharp-edge discontinuities) present within the initial signal. In one example, the signal comprises a time-series signal with the time series representing a sequence of weight measurements from a scale device. In some examples, the scale device includes a platform that supports one or more physical items that may be selectively removed or added to. Here, the signal may include a sequence of step functions corresponding to changes in weight on the scale device (based on the removal or addition of items on the platform), plus corrupting noise from vibration. The techniques described herein may remove the corrupting noise, while preserving the sharp edges representing sudden changes in weight.

21 Claims, 7 Drawing Sheets

SIGNAL PROCESSING TECHNIQUES

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area), and customers can pick items from inventory and take them to a cashier for purchase, rental, and so forth. Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor the movement of inventory, users, and other objects within the facility.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes techniques for removing noise from a signal to generate a modified signal, with the modified signal preserving any transitions of interest (e.g., sharp-edge discontinuities) present within the initial signal. In one example, the signal comprises a time-series signal with the time series representing a sequence of weight measurements from a scale device. In some examples, the scale device includes a platform that supports one or more physical items that may be selectively removed or added to. Here, the signal may include a sequence of step functions corresponding to changes in weight on the scale device (based on the removal or addition of items on the platform), plus corrupting noise from vibration. In some instances, when the signal includes too much noise, the noise may effectively mask or hide a meaningful transition within the signal that indicates that a meaningful event has occurred (e.g., an item being removed from a shelf). Or, the noise itself may be of such magnitude that analysis of the signal may mistakenly identify an event (e.g., the removal of an item from a shelf) when in fact no such event occurred. Thus the techniques described herein may remove the corrupting noise, while preserving the sharp edges representing sudden changes in weight.

Traditional linear filtering techniques may be ill suited to removing noise from such signals while preserving the sharp edges, given that step functions contain high frequency content that often overlaps with the corrupting noise in the frequency domain. The techniques described herein, meanwhile, include an adaptive, nonlinear filtering approach that preserves signal edges, without introducing ringing artifacts.

As described in detail below, an input signal may be processed from left to right using a sliding window of data points of the signal of a fixed size, N. After a first set of N data points is selected, a central mean, $\mu_c$, may be calculated for current window. The central mean, $\mu_c$, may represent the mean of the selected portion of the signal (i.e., the first N data points). Additionally, a left mean $\mu_L$, may be calculated, representing a mean of a first half of the N data points (i.e., the left half of the current window), along with a right mean $\mu_R$, representing a mean of a second half of the N data points (i.e., the right half of the current window).

After calculating these means, the techniques may include computing the magnitude of the jump size, representing the absolute value of the difference between the left and right means. The jump size, $\delta$, may be represented as:

$$\delta = |\mu_R - \mu_L|$$

After computing the jump size, the jump size may be compared to a fixed threshold for selecting which function of multiple functions to associate with the current window. In some instances, the techniques associate a constant function to the window if the jump size is smaller than a threshold, while associating a step function to the window if the jump size is greater than the threshold. In the former instances, the constant function may have a value based on (e.g., equal to) the central mean, while in the latter instances the step function may have a value for the left side of the window based on (e.g., equal to) the left mean while having a value for the right side of the window based on (e.g., equal to) the right mean. As such, each data point of the first N data points in the current window may be assigned a value, based on the threshold comparison, that is equal to one of the left mean, the right mean, or the central mean.

After associating a function to the current window in this manner, the techniques may calculate a weighting factor (or "weight") to assign to data points of the current window. To do so, the techniques may first calculate, for each data point, an error between the assigned value (i.e., the central, left, or right mean) and the actual value of the respective data point as specified by the signal. In some instances, the techniques compute a sum-of-squares error for the entire window and calculating the weighting factor as an inverse of the calculated sum-of-squares error. By making the weighting factor inversely proportional to the error, the techniques assign a relatively large weight to the step function that best aligns with the underlying signal, thus preserving the a sharp edges of the signal. After calculating a value and a weight for each point in the current window, the techniques increment the signal estimate for each point by the value assigned to that point and increment the weight assigned to that point by the calculated weighting factor.

After incrementing the values and weights of the N data points of the current window, the window may be "slid" to the right such that a second N number of data points is within the window. The process may then repeat for these second N number of data points. The final signal estimate at each point, meanwhile, may comprise the summed signal estimate from each window, divided by the weights from each window. That is, because of the sliding window, each data point of the signal may be assigned N number of values and N number of weights, and the final value of each data point may comprise the sum of the N values divided by the sum of the N weights. The techniques thus generate a modified signal based on these values that is piecewise constant, while the final aggregated estimate is a smooth function with a sharp-edge response. This smooth, sharp-edged modified signal may then be used to identify predetermined events, such as a change in the value of the signal representing an item being placed onto or removed from a shelf.

While the examples described herein discuss the techniques applied to a weight-based signal, it is to be appreciated that the techniques may be used to smooth any other series-based signal. Further, while a few example environments in which the techniques may be implemented are described below, it is to be appreciated that these are merely illustrative and that any other similar or different environments may implement the described techniques.

Figure 1:
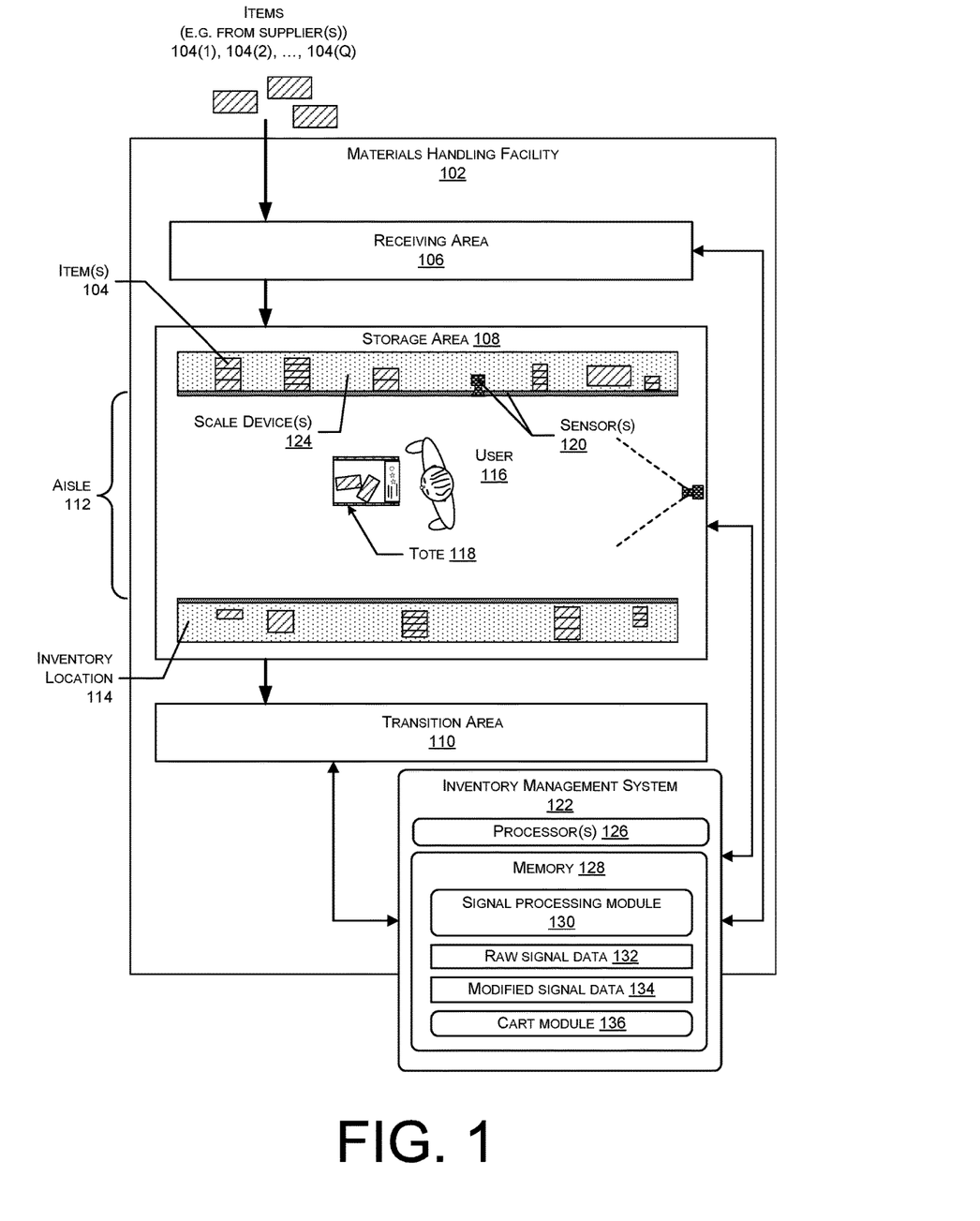
FIG. 1 is a block diagram illustrating a materials handling facility (facility) configured to use sensors, such as weight sensors.

FIG. 1 is a block diagram illustrating a materials handling facility (facility) configured to use sensors, such as weight sensors. A materials handling facility 102 (facility) may comprise one or more physical structures or areas within which one or more items 104(1), 104(2), . . . , 104(Q) may be held. As used in this disclosure, letters in parenthesis such as "(Q)" indicate an integer value. The items 104 may comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114(1), 114(2), . . . , 114(L) may include one or more of shelves, racks, cases, cabinets, bins, floor locations, slatwalls, pegboards, trays, dispensers, or other suitable storage mechanisms. The inventory locations 114 may be affixed to the floor or another portion of the facility's 102 structure. The inventory locations 114 may also be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another. Continuing the example, the inventory location 114 may move from one aisle 112 to another, from one location within an aisle 112 to another, and so forth. In another example, the inventory locations 114 may be configured to translate, rotate, or otherwise move relative to the facility 102.

One or more users 116(1), 116(2), . . . , 116(U) and totes 118(1), 118(2), . . . , 118(T), or other material handling apparatuses may move within the facility 102. For example, the user 116 may move about within the facility 102 to pick or place the items 104 in various inventory locations 114, placing them on the tote 118 for ease of transport. The tote 118 is configured to carry or otherwise transport one or more items 104. For example, the totes 118 may include carts, baskets, bags, bins, and so forth. In some implementations, the tote 118 may incorporate one or more inventory locations 114. For example, the tote 118 may include a bin, basket, shelf, and so forth.

Instead of, or in addition to the users 116, other mechanisms such as robots, forklifts, cranes, aerial drones, conveyors, elevators, pipes, and so forth, may move items 104 about the facility 102. For example, a robot may pick the item 104 from a first inventory location 114(1) and move the item 104 to a second inventory location 114(2).

One or more sensors 120 may be configured to acquire information in the facility 102. The sensors 120 may include, but are not limited to, weight sensors, imaging sensors, proximity sensors, radio frequency (RF) receivers, microphones, temperature sensors, humidity sensors, vibration sensors, and so forth. The sensors 120 may be stationary or mobile, relative to the facility 102. For example, the inventory locations 114, the totes 118, or other devices such as user devices, may contain sensors 120 configured to acquire sensor data. The sensors 120 are discussed in more detail below with regard to FIG. 2.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. In some implementations, multiple different receiving areas 106, storage areas 108, and transition areas 110 may be interspersed rather than segregated.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, or the transition area 110. For instance, the inventory management system may determine when a user picks an item from the inventory locations 114 and, in response, may update a virtual shopping cart associated with the respective user. For instance, if the illustrated user 116 removes a bottle of ketchup from a shelf in the facility 100, one or more sensors may indicate the removal of the item and the inventory management system 122 may store an indication that the virtual shopping cart of the user 116 includes a bottle of ketchup.

The facility 102 may be configured to receive different kinds of items 104 from various suppliers, and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 102.

Upon being received from a supplier at the receiving area 106, the items 104 may be prepared for storage. For example, items 104 may be unpacked or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 102, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another or from one entity to another. For example, the transition area 110 may be a packing station within the facility 102. When the item 104 arrives at the transition area 110, the items 104 may be transitioned from the storage area 108 to the packing station. Information about the transition may be maintained by the inventory management system 122.

In another example, if the items 104 are departing the facility 102, a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

The facility 102 may include one or more scale devices 124 configured to provide information about weight of a load placed upon a weight sensor that couples to or includes a platform on which an item sits. The scale devices 124 may couple to and provide information to the inventory management system 122, which may reside at the facility 100, remote from the facility, or a combination thereof. The inventory management system 122 may comprise one or more computing devices (e.g., servers) and, as illustrated, may include one or more processors 126 and memory 128, which may execute a signal processing module 130. The memory 128 (and other memory described herein) may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114 may be implemented as non-transitory computer-readable storage media ("CRSM"), which may be any available physical media accessible by the processor(s) 112 to execute instructions stored on the memory 128. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 126.

The scale devices 124 may be configured to emit raw signal data 132 to the inventory management system 122. The raw signal data 130 may comprise output from the scale device 124, such as a series of readings produced by one or more of the weight sensors in the scale device 124. In some implementations, the raw signal data 130 may be partially processed, such as comprising a set of downsampled readings. The raw signal data 132 from the scale devices 124 may comprise information indicative of a weight at a particular time, variance or change in weight from one time to another, and so forth.

The inventory management system 122 may be configured to use weight data to track one or more objects in the facility 102, to determine a quantity of items 104, and so forth. For example, the inventory location 114(1) may include a scale device 124(1) and the tote 118(1) may also include a scale device 124(2), producing weight data 132(1) and 132(2), respectively. Based at least in part on the weight data 132(1) decreasing by 1.1 kg and the weight data 132(2) increasing by 1.1 kg within a threshold time period (such as five seconds later), the inventory management system 122 may determine that an item 104 stored at the inventory location 114(1) has been transferred to the tote 118(1).

In some instances, however, the raw signal data includes corrupting noise, which makes it difficult to identify changes in weight as ready by the weight sensors. Because of this, the inventory management system 122 might not accurately track objects removed from or placed onto the inventory locations 114 as desired. In order to aid in this tracking, however, the signal processing module 130 may be configured to process the raw signal data 132 to generate modified signal data 134. As described above and in further detail below with reference to FIGS. 3-6B, the signal processing module 130 may smooth the raw signal data 130 while preserving the sharp edges of the signal.

Figure 2:
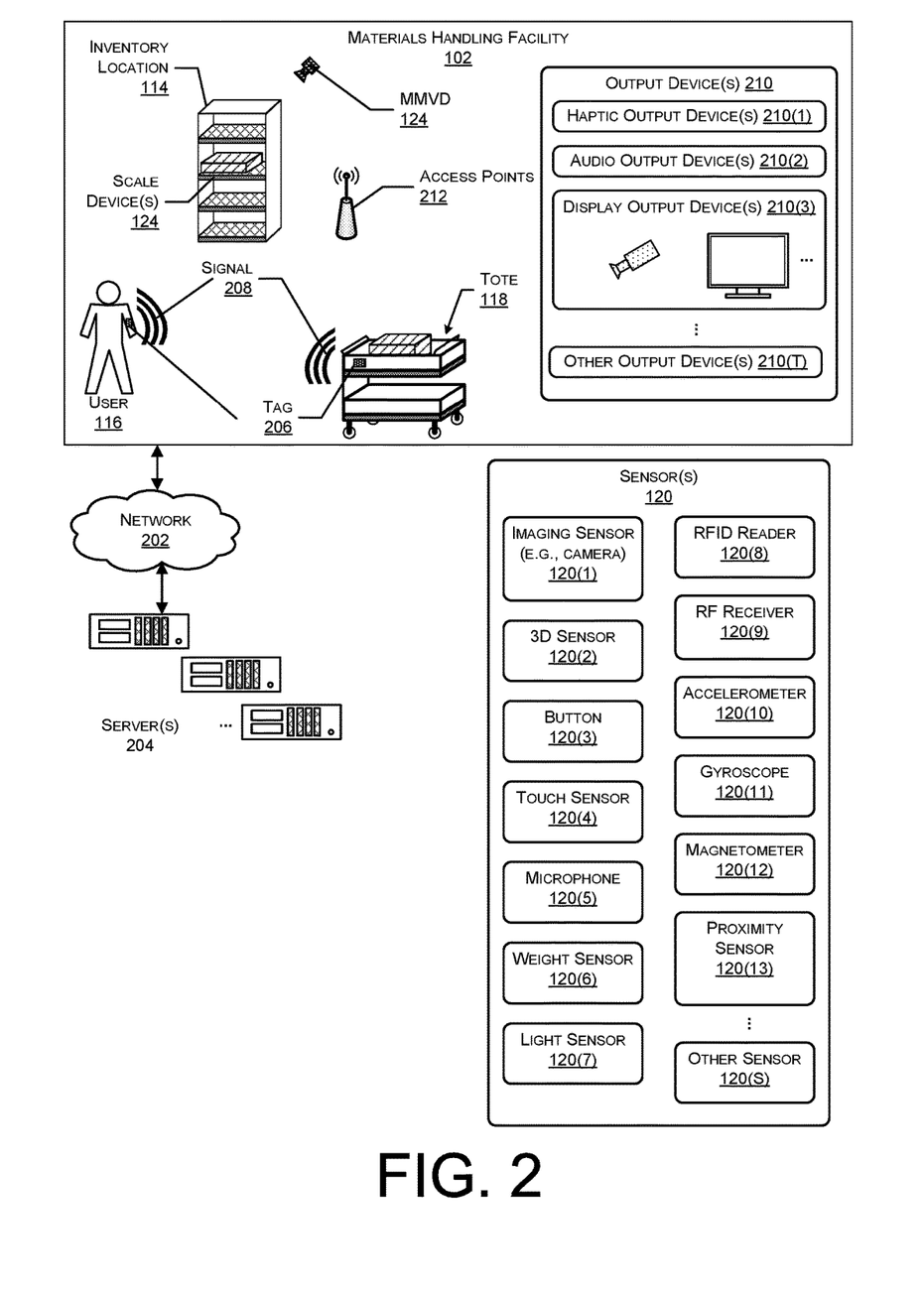
FIG. 2 is a block diagram illustrating additional details of the facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks.

The servers 204 may be configured to execute one or more modules or software applications associated with the inventory management system 122. While the servers 204 are illustrated as being in a location outside of the facility 102, in other implementations, at least a portion of the servers 204 may be located at the facility 102. The facility 102 may include one or more scale devices 124. The scale devices 124 may communicate with the servers 204 using the network 202. The users 116, the totes 118, or other objects in the facility 102 may be equipped with one or more tags 206. The tags 206 are configured to emit a signal 208. In one implementation, the tag 206 may be a radio frequency identification (RFID) tag configured to emit a RF signal 208 upon activation by an external signal. For example, the external signal may comprise a radio frequency signal or a magnetic field configured to energize or activate the RFID tag 206. In another implementation, the tag 206 may comprise a transmitter and a power source configured to power the transmitter. For example, the tag 206 may comprise a Bluetooth® Low Energy (BLE) transmitter and battery. In other implementations, the tag 206 may use other techniques to indicate presence to a corresponding sensor or detector. For example, the tag 206 may be configured to generate an ultrasonic signal 208 that is detected by corresponding acoustic receivers. In yet another implementation, the tag 206 may be configured to emit an optical signal 208.

The inventory management system 122 may be configured to use the tags 206 for one or more of identification of the object, determining a location of the object, and so forth. For example, the users 116 may wear tags 206, the totes 118 may have tags 206 affixed, and so forth, that may be read and be used to determine identity and location. Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, or ceiling, at an inventory location 114, on the tote(s) 118, may be carried or worn by the user(s) 116, and so forth.

The sensors 120 may include one or more imaging sensors 120(1). These imaging sensors 120(1) may include cameras configured to acquire images of a scene. The imaging sensors 120(1) may be configured to detect light in one or more wavelengths including, but not limited to, terahertz, infrared, visible, ultraviolet, and so forth. The inventory management system 122 may use image data acquired by the imaging sensors 120(1) during operation of the facility 102. For example, the inventory management system 122 may identify items 104, users 116, totes 118, and so forth, based at least in part on their appearance within the image data.

One or more 3D sensors 120(2) may also be included in the sensors 120. The 3D sensors 120(2) are configured to acquire spatial or three-dimensional data, such as depth information, about objects within a sensor field of view. The 3D sensors 120(2) may include range cameras, lidar systems, sonar systems, radar systems, structured light systems, stereo vision systems, optical interferometry systems, coded aperture systems, and so forth.

The inventory management system 122 may use the three-dimensional data acquired to identify objects, determine one or more of a location, orientation, or position of an object. The location may be described as where in space within the facility 102 an object is. For example, the location may be specified as X and Y coordinates relative to an origin, where X and Y are mutually orthogonal. In comparison, orientation may be indicative of a direction the object (or a portion thereof) is facing. For example, the orientation may be that the user 116 is facing south. Position may provide information indicative of a physical configuration or pose of the object, such as the arms of the user 116 are stretched out to either side. Pose may provide information on a relative configuration of one or more elements of an object. For example, the pose of the user's 116 hand may indicate whether the hand is open or closed. In another example, the pose of the user 116 may include how the user 116 is holding an item 104.

One or more buttons 120(3) may be configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116. For example, the buttons 120(3) may be used to accept input from a user 116 such as a username and password associated with an account, configuration settings for a device such as a scale device 124, and so forth.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the point of a touch or near-touch. For example, the IFSR may comprise a material configured to change electrical resistance responsive to an applied force. The point of that change in electrical resistance within the material may indicate the point of the touch. The inventory management system 122 may use data from the touch sensors 120(4) to receive information from the user 116. For example, the touch sensor 120(4) may be integrated with the tote 118 to provide a touchscreen with which the user 116 may select from a menu, one or more particular items 104 for picking.

One or more microphones 120(5) may be configured to acquire audio data indicative of sound present in the environment. The sound may include user speech uttered by the user 116. In some implementations, arrays of microphones 120(5) may be used. These arrays may implement beamforming or other techniques to provide for directionality of gain. The inventory management system 122 may use the one or more microphones 120(5) to accept voice input from the users 116, determine the location of one or more users 116 in the facility 102, and so forth.

One or more weight sensors 120(6) may be configured to measure the weight of a load on a platform, such as the weight of an item 104, the user 116, the tote 118, and so forth. The weight sensors 120(6) may be configured to measure the weight of the load at one or more of the inventory locations 114, the tote 118, or on the floor of the facility 102. The weight sensors 120(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, load cells, pneumatic pressure sensors, and so forth. The sensing mechanisms may operate as transducers that generate one or more signals based on an applied force, such as that of the load due to gravity.

A scale device 124 may include one or more weight sensors 120(6) to produce sensor data that may be processed to generate weight data. The inventory management system 122 may use the weight data to identify an object, determine a location of an object, maintain shipping records, and so forth. For example, the scale device 124 at a particular location in the facility 102 may report a weight of the user 116, indicating the user 116 is present at that location.

The sensors 120 may include one or more light sensors 120(7). The light sensors 120(7) may be configured to provide information associated with ambient lighting conditions such as a level of illumination. Information acquired by the light sensors 120(7) may be used by the inventory management system 122 to adjust a level, intensity, or configuration of the output device 210.

One more radio frequency identification (RFID) readers 120(8), near field communication (NFC) systems, and so forth, may also be provided as sensors 120. For example, the RFID readers 120(8) may be configured to read the RF tags 206. Information acquired by the RFID reader 120(8) may be used by the inventory management system 122 to identify an object associated with the RF tag 206 such as the item 104, the user 116, the tote 118, and so forth.

One or more RF receivers 120(9) may also be provided. In some implementations, the RF receivers 120(9) may be part of transceiver assemblies. The RF receivers 120(9) may be configured to acquire RF signals 208 associated with Wi-Fi™, Bluetooth®, ZigBee®, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source such as a device carried by the user 116.

The sensors 120 may include one or more accelerometers 120(10), which may be worn or carried by the user 116, mounted to the tote 118, and so forth. The accelerometers 120(10) may provide information such as the direction and magnitude of an imposed acceleration. Data such as rate of acceleration, determination of changes in direction, speed, and so forth, may be determined using the accelerometers 120(10).

A gyroscope 120(11) may provide information indicative of rotation of an object affixed thereto. For example, the tote 118 or other objects or devices may be equipped with a gyroscope 120(11) to provide data indicative of a change in orientation.

A magnetometer 120(12) may be used to determine a heading by measuring ambient magnetic fields, such as the terrestrial magnetic field. The magnetometer 120(12) may be worn or carried by the user 116, mounted to the tote 118, and so forth. For example, the magnetometer 120(12) as worn by the user 116(1) may act as a compass and provide information indicative of which way the user 116(1) is facing.

A proximity sensor 120(13) may be used to determine presence of an object, such as the user 116, the tote 118, and so forth. The proximity sensors 120(13) may use optical, electrical, ultrasonic, electromagnetic, or other techniques to determine a presence of an object. In some implementations, the proximity sensors 120(13) may use an optical emitter and an optical detector to determine proximity. For example, an optical emitter may emit light, a portion of which may then be reflected by the object back to the optical detector to provide an indication that the object is proximate to the proximity sensor 120(13). In other implementations, the proximity sensors 120(13) may comprise a capacitive proximity sensor 120(13) configured to provide an electrical field and determine a change in electrical capacitance due to presence or absence of an object within the electrical field.

The proximity sensors 120(13) may be configured to provide sensor data 130 indicative of one or more of a presence or absence of an object, a distance to the object, or characteristics of the object. An optical proximity sensor 120(13) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using an imaging sensor 120(1) such as a camera. Based on an apparent distance between the features of the structured light pattern, the distance to the object may be calculated. Other techniques may also be used to determine distance to the object. In another example, the color of the reflected light may be used to characterize the object, such as skin, clothing, tote 118, and so forth. In some implementations, a proximity sensor 120(13) may be installed at the inventory location 114.

The sensors 120 may include other sensors 120(S) as well. For example, the other sensors 120(S) may include ultrasonic rangefinders, thermometers, barometric sensors, hygrometers, vibration sensors, or biometric input devices. Continuing the example, the biometric input devices may include, but not limited to, fingerprint readers, palm scanners, and so forth.

The facility 102 may include one or more access points 212 configured to establish one or more wireless networks. The access points 212 may use Wi-Fi™, NFC, Bluetooth®, or other technologies to establish wireless communications between a device and the network 202. The wireless networks allow the devices to communicate with one or more of the inventory management system 122, the sensors 120, the scale devices 124, the tag 206, a communication device of the tote 118, or other devices. In other implementations, a wired networking infrastructure may be implemented. For example, cabling may be used to provide Ethernet local area network connectivity.

The output devices 210 may also be provided in the facility 102. The output devices 210 may be configured to generate signals that may be perceived by the user 116.

Haptic output devices 210(1) may be configured to provide a signal that results in a tactile sensation to the user 116. The haptic output devices 210(1) may use one or more mechanisms such as electrical stimulation or mechanical displacement to provide the signal. For example, the haptic output devices 210(1) may be configured to generate a modulated electrical signal that produces an apparent tactile sensation in one or more fingers of the user 116. In another example, the haptic output devices 210(1) may comprise piezoelectric or rotary motor devices configured to provide a vibration that may be felt by the user 116.

One or more audio output devices 210(2) are configured to provide acoustic output. The acoustic output includes one or more of infrasonic sound, audible sound, or ultrasonic sound. The audio output devices 210(2) may use one or more mechanisms to generate the sound. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

The display output devices 210(3) may be configured to provide output that may be seen by the user 116 or detected by a light-sensitive detector such as an imaging sensor 120(1) or light sensor 120(7). The output from the display output devices 210(3) may be monochrome or color. The display output devices 210(3) may be emissive, reflective, or both emissive and reflective. An emissive display output device 210(3) is configured to emit light during operation. For example, a light emitting diode (LED) is an emissive visual display output device 210(3). In comparison, a reflective display output device 210(3) relies on ambient light to present an image. For example, an electrophoretic display is a reflective display output device 210(3). Backlights or front lights may be used to illuminate the reflective visual display output device 210(3) to provide visibility of the information in conditions where the ambient light levels are low.

Mechanisms of the display output devices 210(3) may include liquid crystal displays, transparent organic LEDs, electrophoretic displays, image projectors, or other display mechanisms. The other display mechanisms may include, but are not limited to, micro-electromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display output devices 210(3) may be configured to present images. For example, the display output devices 210(3) may comprise a pixel-addressable display. The image may comprise at least a two-dimensional array of pixels or a vector representation of an at least two-dimensional image.

In some implementations, the display output devices 210(3) may be configured to provide non-image data, such as text characters, colors, and so forth. For example, a segmented electrophoretic display, segmented LED, and so forth, may be used to present information such as a stock keeping unit (SKU) number. The display output devices 210(3) may also be configurable to vary the color of the text, such as using multicolor LED segments.

In some implementations, display output devices 210(3) may be configurable to provide image or non-image output. For example, an electrophoretic display 210(3) with addressable pixels may be used to present images of text information, or all of the pixels may be set to a solid color to provide a colored panel.

The output devices 210 may include hardware processors, memory, and other elements configured to present a user interface. In one implementation, the display output devices 210(3) may be arranged along the edges of inventory locations 114.

Other output devices 210(T) may also be present at the facility 102. The other output devices 210(T) may include lights, scent/odor dispensers, document printers, three-dimensional printers or fabrication equipment, and so forth. For example, the other output devices 210(T) may include lights that are located on the inventory locations 114, the totes 118, and so forth.

Figure 3:
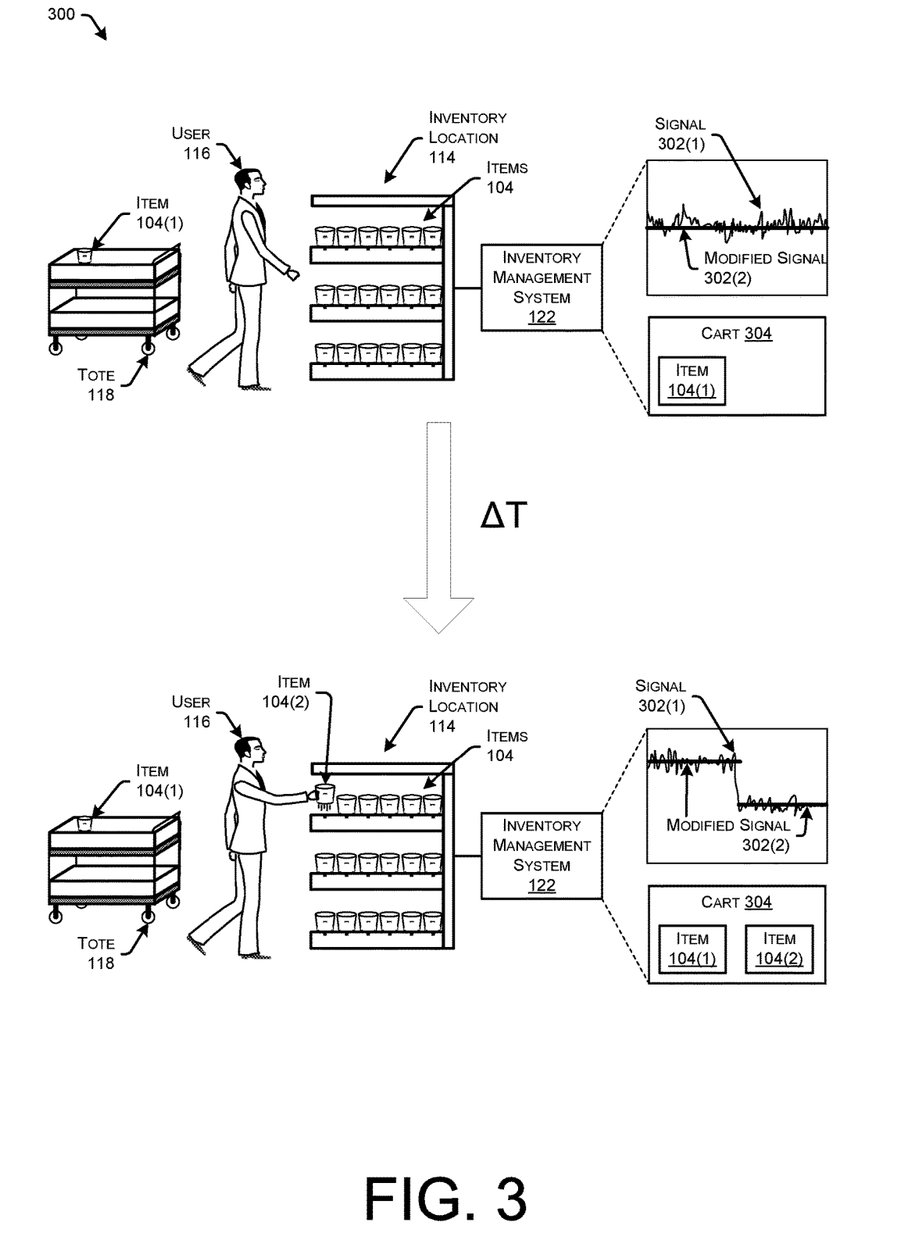
FIG. 3 illustrates a scenario where a weight sensor residing underneath multiple items generates a signal representing a collective weight of the items before, during, and after removal of an item form the shelf by a user. An inventory management system removes noise from the signal such that the removal of the item from the shelf may be detected based on analysis of the modified signal.

FIG. 3 illustrates a scenario 300 where a weight sensor couples to a platform that is underneath multiple items 114, such that the weight sensor generates a signal 302(1). As discussed above, the signal 302(1) may represent a collective weight of the items over time, potentially along with force caused by vibration or other unwanted noise. In some instances, the signal 302(1) represents the weight on a signal shelf or portion of a shelf, while in other instances it may represent a collective weight or multiple shelves.

Also as illustrated, the inventory management system 122 is configured to receive the initial signal 302(1) and apply one or more processing techniques to generate a modified signal 302(2). As illustrated and discussed with reference to FIG. 4 below, the modified signal 302(2) may have less noise than the initial signal 302(2) while preserving any sharp edges in the signal. In addition, the inventory management system 122 may maintain a virtual shopping cart 304 for the illustrated user 116 as the user 116 moves through the facility 100. In this example, the user 116 has picked a single item 104(1) (shown in the tote 118) and, hence, the cart 304 includes an indication of the item 104(1).

After some amount of time elapses, however, the user 116 picks a second item 104(1) from the shelf. As illustrated, the weight sensor provides, to the inventory management system 122, a signal indicative of the weight on the shelf. As such, the signal 302(2) generally indicates a step-down in weight. In addition, the inventory management system 122 continues to apply the processing techniques to the signal 302(1) to continue generating the modified signal 302(1). As illustrated, the modified signal 302(2) is smooth yet represents the step-down caused by removal of the item 104(2). In response to identifying this step-down in the modified signal, the inventory management system 122 has added an indication of the item 104(2) to the cart 304 of the user 116.

Figure 4:
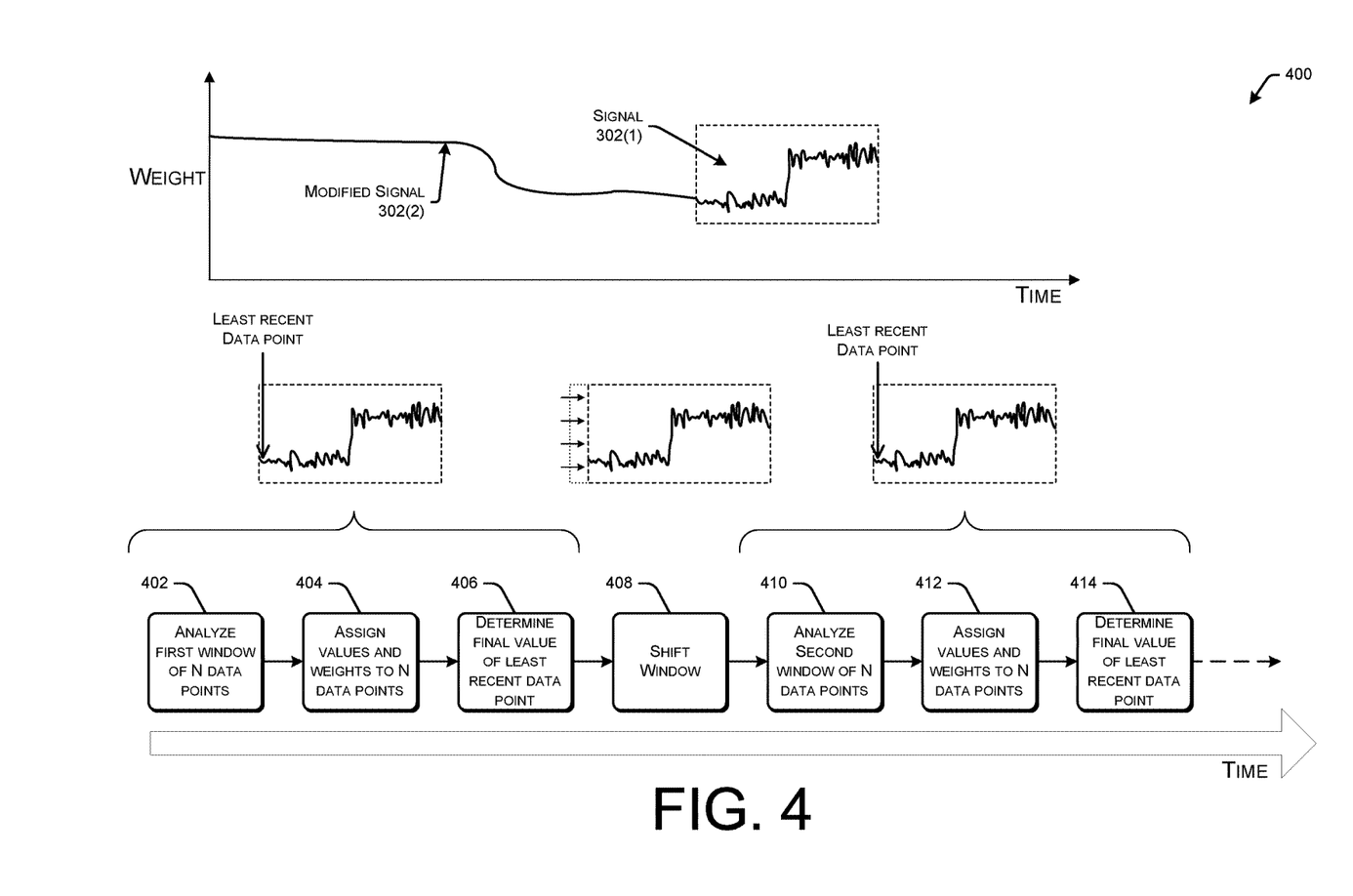
FIG. 4 illustrates a flow diagram of an example process for removing noise from a time-series signal while maintaining transitions in the signal.

FIG. 4 illustrates a flow diagram of an example process 400 for removing noise from a time-series signal while maintaining transitions in the signal. As illustrated, the initial signal 302(1) received from the weight sensor (or the like) includes noise, while the modified signal 302(2) that has been processed is smooth yet includes sharp-edges present in the initial signal 302(1). The process 400 describes, a high-level, the processing techniques as applied to two iterations of a sliding window corresponding to respective portions of the signal 302(1). It is to be appreciated that the process 400 may continue on in order to generate the modified signal 302(2).

The process 400, and each process described herein, is illustrated as a collection of blocks in a logical flow graph, which represent a sequence of operations that can be implemented in hardware, software, or a combination thereof. In the context of software, the blocks represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some instances, some or all of the processes described herein may be performed by the signal processing module 130.

Figure 5:
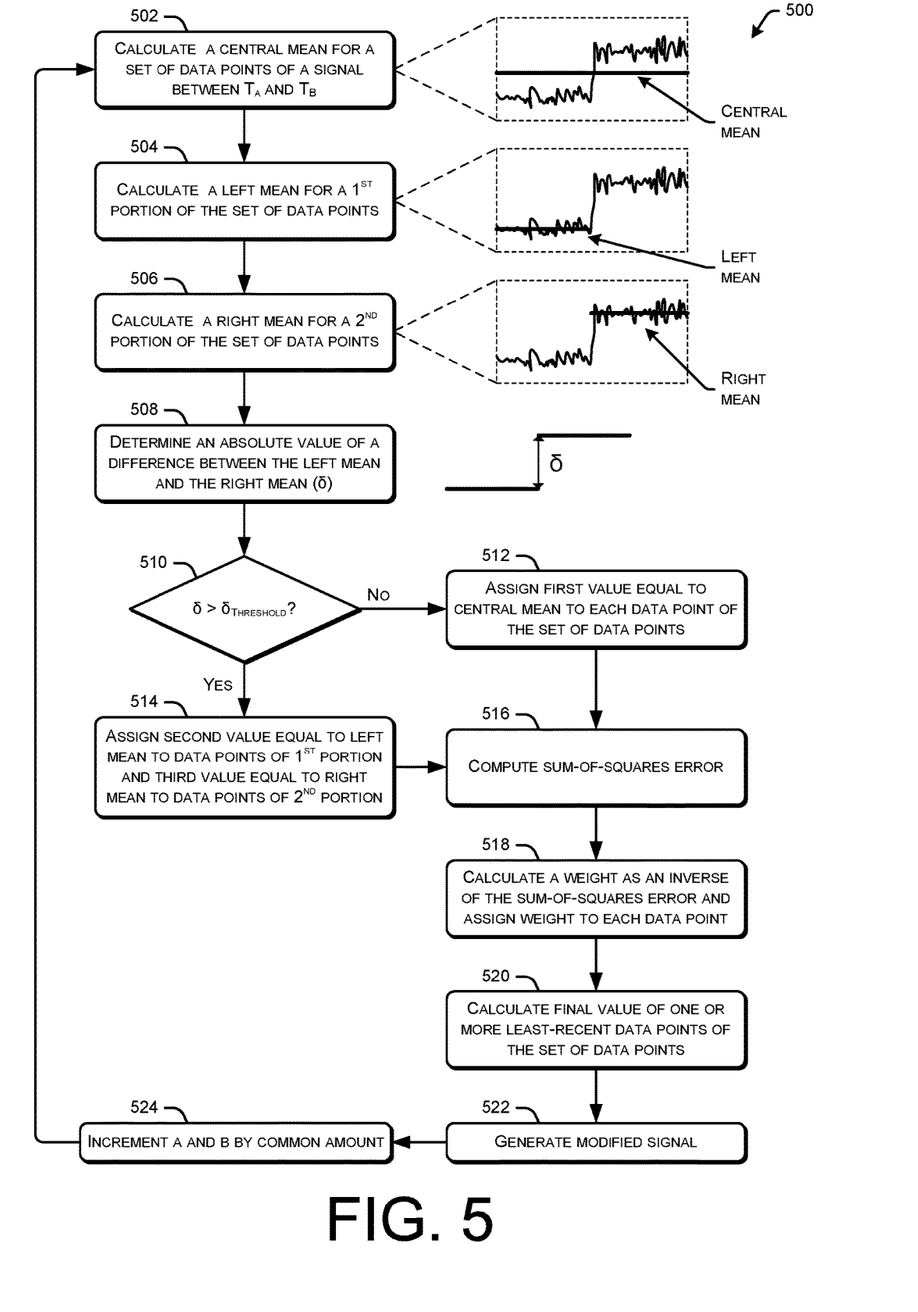
FIG. 5 illustrates a flow diagram of another example process for removing noise from a time-series signal while maintaining transitions in the signal.

At 402, the signal processing module analyzes a first window of N data points. The number of data points, N, may be configurable and may vary, but generally may remain constant during the analysis of the multiple windows. Regardless of the precise number of data points, analyzing the window may include determining whether the window generally represents a step or whether the window represents a constant and thereafter associating a corresponding function to the window. Of course, while the above example describes associating a step function or a constant function to the window, in other instances any other number of functions may be applied to a window, such as linear, binomial, polynomial, or the like. FIG. 5 discusses the analyzing in greater detail below.

After analyzing the window, at 404 the signal processing module 130 assigns values and weights to each data point of the window. This may include storing, for each data point, a value calculated for that data point based on the analysis of the first window as well as a weight calculated for the data point. In some instances, the weighting factor may be calculated for the entire window and, hence, the value of the weight may be uniform for each data point.

At 406, the signal processing module 130 determines a final value for the lease recent data point of the first window. That is, in instances where the window remains of a constant size and is shifted one data point at a time, the least recent data point of the signal (located on the far left of the window) has now been assigned N number of values and N number of weighting factors. The signal processing module 130 may determine the final value for this data point based on these N values and N weighting factors. In some instances, the final value comprises the summation of the N values divided by the summation of the N weighting factors. After calculating the final value of the least-recent data point, this value may be used to generate (e.g., add to) the modified signal 302(2) representing the smoothed, de-noised version of the signal 302(1).

At 408, the signal processing module 130 shifts the window. This may include selecting a second set of N data points for analysis. In some instances, the first and second sets of data points substantially overlap. For instance, in one example the window comprises sixty samples and shifts one sample to the right in each instance. Thus, at the conclusion of the processing of each window, one data point (the least-recent data point) is assigned a final value, 59 data points are again analyzed in the subsequent window, and one new data point (the most-recent data point) is analyzed in the subsequent window. Of course, while one example is described, it is to appreciated that the windows may be of any other size and may be shifted by multiple data points in some instances.

After shifting the window, at 410 the signal processing module 130 analyzes the first window of N data points. Again, analyzing the window may include determining whether the window generally represents a step or whether the window represents a constant and thereafter associating a corresponding function to the window. After analyzing the window, at 412 the signal processing module 130 assigns values and weighting factors to each data point of the second window. This may include storing, for each data point, a value calculated for that data point based on the analysis of the second window as well as a weight calculated for the data point. At 414, the signal processing module 130 determines a final value for the lease recent data point of the second window. Again, after calculating the final value of the least-recent data point, this value may be used to generate (e.g., add to) the modified signal 302(2) representing the smoothed, de-noised version of the signal 302(1).

FIG. 5 illustrates a flow diagram of another example process 500 for removing noise from a time-series signal while maintaining transitions in the signal. At 502, the signal processing module 130 calculates a central mean for a set of N data points corresponding to a portion of a signal between a time, TA, and a time, TB. As described above, the central mean comprises an average value of the data points of the set of N data points. At 504, the signal processing module 130 calculates a left mean for a first portion of the N data points. The left mean may comprise an average value of the data points on left half of the window, or any other portion beginning on the left side of the window of the N data points. At 506, the signal processing module 130 calculates a right mean for a second portion of the N data points. The signal processing module 130 mean may comprise an average value of the data points on the signal processing module 130 half of the window, or any other portion beginning on the right side of the window of the N data points.

After calculating the means, at 508 the signal processing module 130 determines an absolute value of a difference between the left mean and the right mean and, at 510, determines whether this absolute value is greater than a threshold. If not, then at 512 the signal processing module 130 assigns a first value equal to the central mean to each data point of the window of data points. If the difference is greater, meanwhile, then at 514 the signal processing module 130 assigns a second value equal to the left mean to data points of the first portion of the window and a third value equal to the right mean to data points of the second portion of the window. For instance, the signal processing module 130 may assign a value equal to the left mean to each data point on a left half of the window, while assigning a value equal to the right mean to each data point on a right half of the window.

After assigning values to the data points, the signal processing module 130 may, at 516, compute a sum-of-squares error for the window, measuring a discrepancy between the assigned values and the actual values specified by the signal. At 518, the signal processing module 130 assigns a weighting factor to each data point of the window equal to an inverse of the sum-of-squares error. In some instances, the weighting factor is equal to an inverse of a summation of the sum-of-squares error plus a small constant, to avoid a scenario where a zero error results in divide-by-zero calculation. At 520, the signal processing module 130 then calculates a final value for a least-recent data point (i.e., the "far-left data point") of the window based on the value assigned to this data point, the weighting factor associated to this data point, as well as the previous values and weights assigned to this data point during analysis of previous windows that included the data point. As discussed above, the final value may be calculated as the summation of the value assigned to this data point divided by the summation of the weighting factors assigned to this data point. At 522, the signal processing module 130 then generates a modified signal based in part on this final value. In some instances, generating the modified signal may include adding to previous final values of data points calculated in the same fashion.

Finally, at 524, the signal processing module 130 increments A and B by a common amount and the process returns to the operation 502. For instance, the process 500 may increment the values of A and B in an amount that corresponds to a signal sample of the signal, such that the window defined at 502 has effectively been "shifted to the right" by one data point. As such, the process 500 may continue to shift the window by incrementing the A and B and repeating the operations for new sets of windows.

Figure 6A:
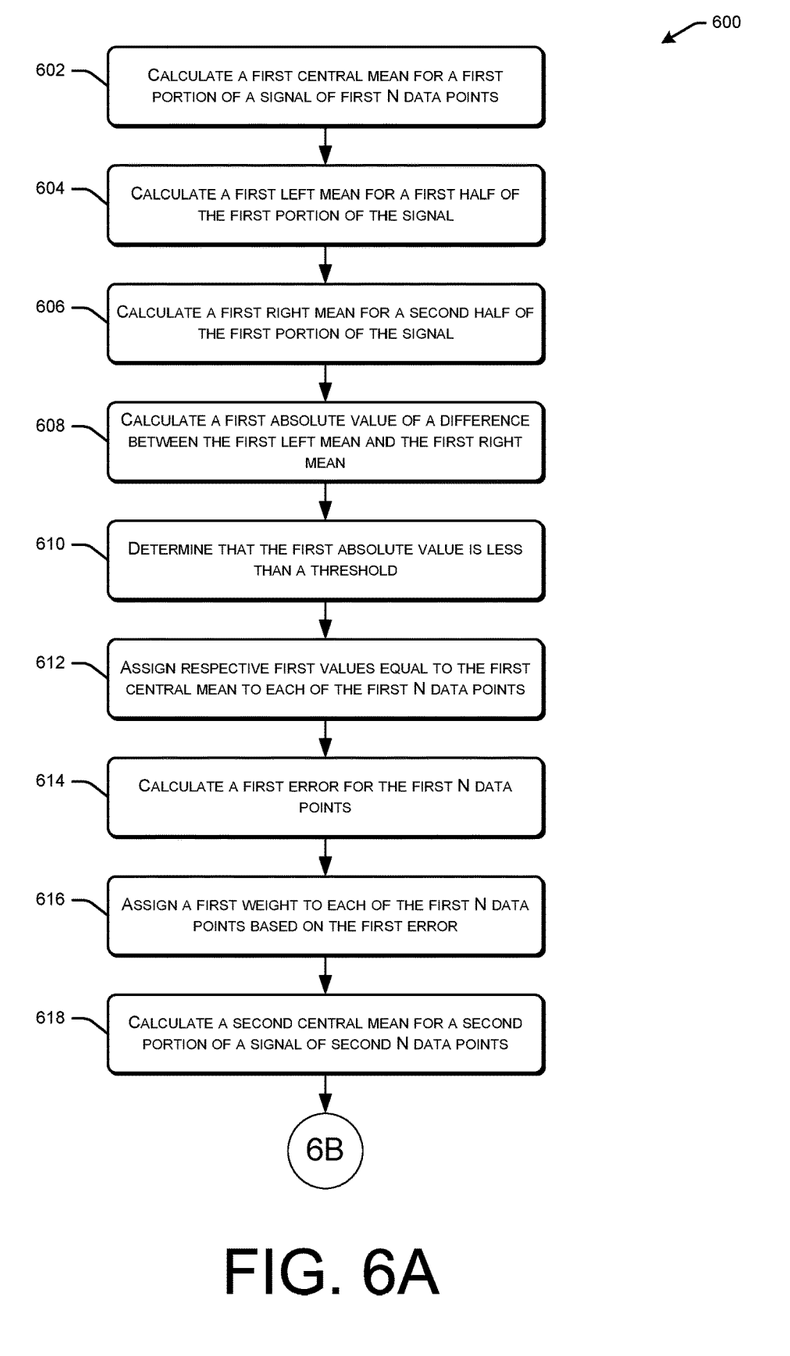
FIGS. 6A-B collectively illustrate a flow diagram of yet another example process for removing noise from a time-series signal while maintaining transitions in the signal.
Figure 6B:
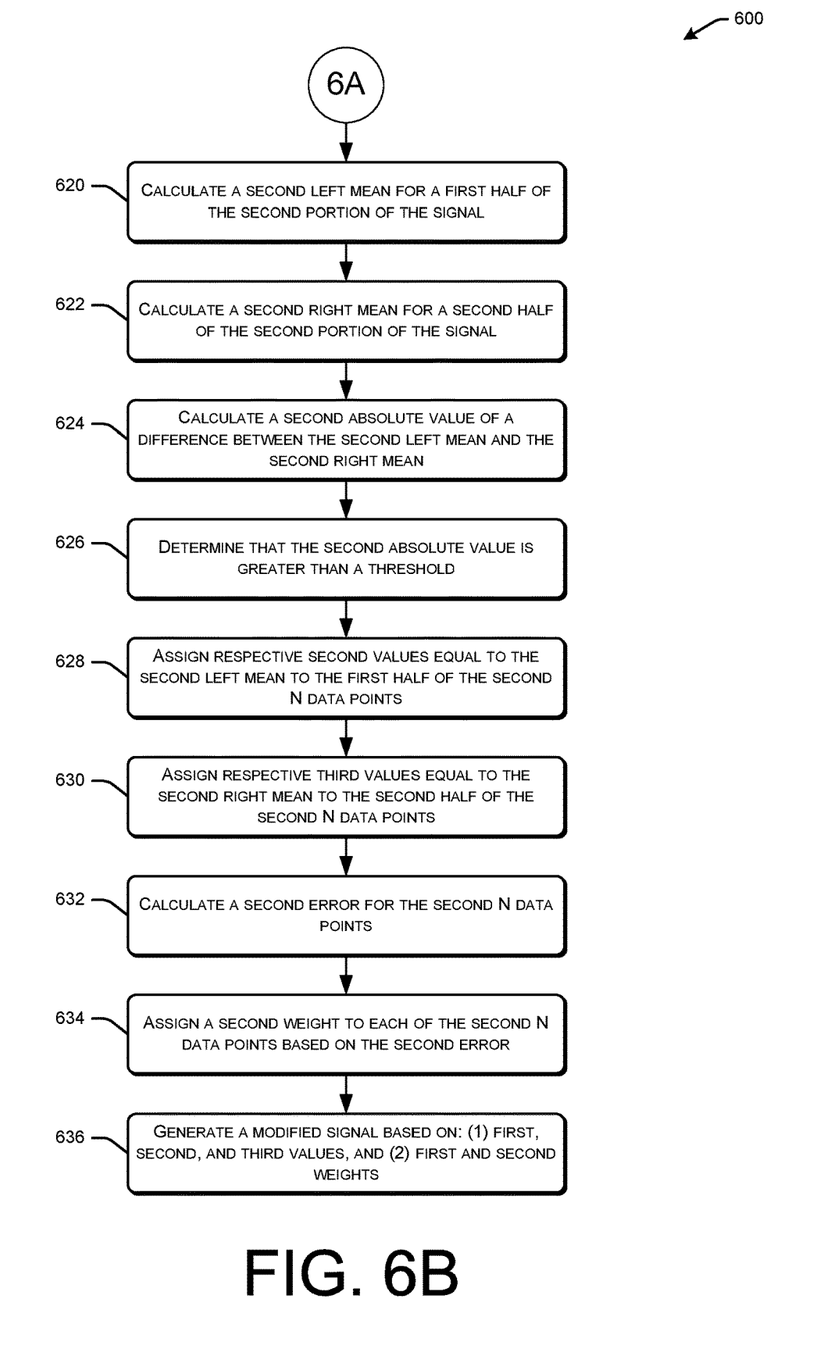

FIGS. 6A-B collectively illustrate a flow diagram of yet another example process 600 for removing noise from a time-series signal while maintaining transitions in the signal. At 602, the signal processing module 130 calculates a first central mean for a first portion of a signal, the first portion include N data points. At 604, the signal processing module 130 calculates a first left mean for a first half of the first portion of the signal, while at 606 the signal processing module 130 calculates a first right mean for a second half of the first portion of the signal.

At 608, the signal processing module 130 calculates a first absolute value of a difference between the first left mean and the first right mean. At 610, the signal processing module 130 determines that the first absolute value is less than a threshold. Therefore, at 612 the signal processing module 130 assigns first respective values equal to the first central mean to each of the first N data points. At 614, the signal processing module 130 calculates a first error for the first N data points. In some instances, the first error comprises a sum-of-squares error. At 616, the signal processing module 130 assigns a first weight to each of the first N data points based on the first error. In some instances, the first weight is equal to an inverse of the first error.

At 618, the signal processing module 130 calculates a second central mean for a second portion of the signal, the second portion also including N data points. FIG. 6B continues the illustration of the process 600. At 620, the signal processing module 130 calculates a second left mean for a first half of the second portion of the signal, while at 622 the signal processing module 130 calculates a second right mean for a second half of the second portion of the signal.

At 624, the signal processing module 130 calculates a second absolute value of a difference between second first left mean and the second right mean. At 626, the signal processing module 130 determines that the second absolute value is greater than the threshold. Therefore, at 628 the signal processing module 130 assigns second respective values equal to the second left mean to each data point of the first half of the second N data points. At 630, the signal processing module assigns respective third values equal to the second right mean to each data point of the second half of the second portion of the signal. At 632, the signal processing module 130 calculates a second error for the second N data points and, at 634, assigns a second weight to each of the second N data points based on the second error. Finally, at 636, the signal processing module 130 generates a modified signal based at least in part on the first, second, and third values, and the first and second weights.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   a platform to hold one or more items;
   a load cell coupled to the platform and configured to generate a signal, the signal corresponding to a weight of the one or more items;
   one or more processors; and
   one or more computer-readable media storing computer-executable instructions that, when executed, cause the one or more processors to perform acts comprising:
      calculating a first mean of a first number of data points, N, of the signal;
      calculating a first left mean comprising a mean of a first half of the first N number of data points;
      calculating a first right mean comprising a mean of a second half of the first N number of data points;
      calculating a first absolute value of a difference between the first left mean and the first right mean;
      determining that the first absolute value of the difference is less than a threshold;
      assigning a first value equal to the first mean to each data point of the first N number of data points;
      calculating a second mean of a second number of data points, N, at least some of the second N number of data points being the same as data points of the first N number of data points;
      calculating a second left mean comprising a mean of a first half of the second N number of data points;
      calculating a second right mean comprising a mean of a second half of the second N number of data points;
      calculating a second absolute value of a difference between the second left mean and the second right mean;
      determining that the second absolute value of the difference is greater than the threshold;
      assigning a second value equal to the second left mean to each data point of the first half of the second N number of data points;
      assigning a third value equal to the second right mean to each data point of the second half of the second N number of data points; and
      generating a modified signal based at least in part on the first values, the second values, and the third values.

2. The system as recited in claim 1, the acts further comprising:
   calculating, for the data points of the first N number of data points, an error based at least in part on the first value and respective first actual values of the data points of the first N number of data points as specified by the signal;
   assigning a first weight to each of the data points of the first N number of data points, the first weight being substantially inversely proportional to the first error;
   and wherein the generating further comprises generating the modified signal based at least in part on the first weight.

3. A method comprising:
   generating, using one or weight sensors coupled to a platform, a signal representing a weight of one or more items on the platform;

calculating a first mean for a first portion of a first set of data points of the signal;
calculating a second mean for a second portion of the first set of data points;
comparing a difference between the first mean and the second mean to a threshold;
assigning, based at least in part on the comparing, a first value equal to the first mean to each data point of the first portion of the first set of data points;
assigning, based at least in part on the comparing, a second value equal to the second mean to each data point of the second portion of the first set of data points;
generating a modified signal based at least in part on the first value assigned to each data point of the first portion of the first set of data points and the second value assigned to each data point of the second portion of the first set of data points;
analyzing the modified signal to determine that the weight has changed by a least a threshold amount;
determining that at least one item has been removed from or placed onto the platform; and
updating a virtual cart of a user to indicate that the at least one item has been removed from or placed onto the platform.

4. The method as recited in claim 3, wherein the comparing comprises comparing an absolute value of the difference to the threshold, and further comprising determining that the absolute value is less than the threshold.

5. The method as recited in claim 3, further comprising:
calculating a third mean for a second set of data of data points of the signal;
calculating a fourth mean for a first portion of the second set of data points;
calculating a fifth mean for a second portion of the second set of data points;
comparing a difference between the fourth mean and fifth mean to the threshold;
assigning, based at least in part on the comparing, a third value equal to the third mean to each data point of the second set of data points;
and wherein the generating comprises generating the modified signal based at least in part on: (i) the first value assigned to each data point of the first portion of the first set of data points; (ii) the second value assigned to each data point of the second portion of the first set of data points, and (iii) the third value assigned to each data point of the second set of data points.

6. The method as recited in claim 5, wherein the comparing comprises comparing an absolute value of the difference between the fourth and fifth mean to the threshold, and further comprising determining that the absolute value is greater than the threshold.

7. The method as recited in claim 5, wherein the second set of data points includes a most recent data point of the signal and each data point of the first set of data points other than a least recent data point of the first set of data points.

8. The method as recited in claim 3, further comprising:
calculating, for each data point of the first portion of the first set of data points, a respective error based at least in part on a difference between the first value and an actual value of the respective data point as specified by the signal;
assigning a weight to each data point of the first portion of the first set of data points, the first weight based at least in part on each respective error;
and wherein the generating further comprises generating the modified signal based at least in part on the weight.

9. The method as recited in claim 8, further comprising:
calculating a sum-of-squares of each error; and
calculating the weight as an inverse of a summation of the sum-of-squares and a constant value.

10. A system comprising:
one or more weight sensors coupled to a platform and configured to generate a signal, the signal corresponding to a weight of one or more items on the platform;
one or more processors; and
one or more computer-readable media storing computer-executable instructions that, when executed on the one or more processors, cause the one or more processors to perform acts comprising:
receiving the signal representing the weight of one or more items on the platform;
analyzing a set of data points of the signal to determine a function to associate with the set of data points, the set having a size of N data points, each of the N data points corresponding to a respective time value between a time TA and a time TB, the N data points including a first data point;
assigning a particular value to the first data point based at least in part on the function;
incrementing a value of A and a value of B by a common amount, the common amount corresponding to a single data point of the signal;
repeating the analyzing, the associating, the assigning, and the incrementing at least N-1 number of times such that N particular values are assigned to the first data point;
determining a final value of the first data point based at least in part on the N particular values assigned to the first data point;
generating a modified signal based at least in part on the final value of the first data point;
analyzing the modified signal to determine that the weight has changed by a least a threshold amount;
determining that at least one item has been removed from or placed onto the platform; and
updating a virtual cart of a user to indicate that the at least one item has been removed from or placed onto the platform.

11. The system as recited in claim 10, wherein the analyzing the set of data points comprises:
calculating a first mean of the set comprising a mean of each of the N data points;
calculating a second mean comprising a mean of a first portion of the N data points;
calculating a third mean comprising a mean of a second portion of the N data points;
determining an absolute value of a difference between the second and third means; and
comparing the absolute value of the difference to a threshold.

12. The system as recited in claim 11, the acts further comprising:
associating a constant function to the set at least partly in response to determining that the absolute value of the difference is less than the threshold, the constant function corresponding to the first mean;
and wherein the assigning comprises assigning a particular value equal to the first mean to the first data point.

13. The system as recited in claim 11, the acts further comprising associating a step function to the set at least partly in response to determining that the absolute value of the difference is greater than the threshold.

14. The system as recited in claim 13, wherein:
- the associating the step function to the set comprises associating the step function having a first constant value equal to the second mean and a second constant value equal to the third mean; and
- the assigning comprises assigning a particular value equal to the second mean or the third mean to first data point.

15. The system as recited in claim 11, the acts further comprising associating a step function to the set at least partly in response to determining that the absolute value of the difference is greater than the threshold, the step function having a first constant value associated with a first half of the N data points and a second constant value associated with a second half of the N data points.

16. The system as recited in claim 10, the acts further comprising:
- calculating a weight to assign to the particular value assigned to the first data point;

wherein:
- the repeating further comprises repeating the calculating at least N-1 number of times such that N weights are assigned to the first data point; and
- the determining the final value of the first data point is further based at least in part on each of N weights assigned to respective values of the N particular values assigned to the first data point.

17. The system as recited in claim 16, wherein the determining the final value of the first data point comprises calculating a summation of the N particular values assigned to the first data point divided by a summation of the N weights assigned to the first data point.

18. The system as recited in claim 10, the acts further comprising:
- assigning a respective value to each data point of the N data points based at least in part on the associating;
- calculating a respective error for each data point of the N data points based at least in part on a respective difference between the respective value of the respective data point and a value of the respective data point as specified by the signal;
- calculating an error for the N data points based at least in part on each respective error of the N data points; and
- calculating a weight to assign to each respective value assigned to each data point of the N data points.

19. The system as recited in claim 18, wherein the calculating the weight comprises calculating the weight as an inverse of a summation of a sum-of-squares of the respective errors of the N data points and a constant value.

20. A method comprising:
- generating, using one or more weight sensors coupled to a platform, a signal representing a weight of one or more items on the platform;
- calculating a first mean for a first portion of a first set of data points of the signal;
- calculating a second mean for a second portion of the first set of data points;
- analyzing the first mean with reference to the second mean;
- assigning, based at least in part on the analyzing, a first value to at least one data point of the first portion of the first set of data points;
- assigning, based at least in part on the analyzing, a second value to at least data point of the second portion of data points;
- generating a modified signal based at least in part on the first value and the second value;
- analyzing the modified signal to determine that the weight has changed by a least a threshold amount;
- determining that at least one item has been removed from or placed onto the platform; and
- updating a virtual cart of a user to indicate that the at least one item has been removed from or placed onto the platform.

21. A method comprising:
- generating, using one or more weight sensors coupled to a platform, a signal representing a weight of one or more items on the platform;
- determining a mathematical function to apply to the signal for removing noise from the signal;
- applying the mathematical function to the signal to generate a modified signal;
- analyzing the modified signal to determine that the weight has changed by at least a threshold amount;
- determining that at least one item has been removed from or placed onto the platform; and
- updating a virtual cart of a user to indicate that the at least one item has been removed from or placed onto the platform.

* * * * *